(12) United States Patent
Kim

(10) Patent No.: US 11,814,018 B2
(45) Date of Patent: Nov. 14, 2023

(54) CONNECTING APPARATUS FOR WIPER, WIPER BLADE ASSEMBLY, AND WIPER DEVICE

(71) Applicant: CAP CORPORATION, Gyeongsangbuk-Do (KR)

(72) Inventor: Myoung Yeon Kim, Ulsan (KR)

(73) Assignee: CAP CORPORATION, Gyeongsanbuk-Do (KR)

( * ) Notice: Subject to any disclaimer, the term of this patent is extended or adjusted under 35 U.S.C. 154(b) by 0 days.

(21) Appl. No.: 17/903,137

(22) Filed: Sep. 6, 2022

(65) Prior Publication Data

US 2023/0073257 A1 Mar. 9, 2023

(30) Foreign Application Priority Data

Sep. 8, 2021 (KR) .................. 10-2021-0120038

(51) Int. Cl.
*B60S 1/40* (2006.01)
(52) U.S. Cl.
CPC ........... *B60S 1/4003* (2013.01); *B60S 1/4048* (2013.01)
(58) Field of Classification Search
CPC ..... B60S 1/3891; B60S 1/3887; B60S 1/4048
See application file for complete search history.

(56) References Cited

U.S. PATENT DOCUMENTS

| 9,573,568 B2 | 2/2017 | Egner-Walter et al. |
| 2015/0258967 A1* | 9/2015 | Lepper ................. B60S 1/4003 15/250.32 |

FOREIGN PATENT DOCUMENTS

| JP | 2015-503483 A | 2/2015 |
| KR | 10-2017-0110407 A | 10/2017 |

OTHER PUBLICATIONS

Office Action for the Korean Patent Application No. 10-2021-0120038 issued by the Korean Intellectual Property Office on Dec. 23, 2022.

* cited by examiner

*Primary Examiner* — Andrew A Horton
(74) *Attorney, Agent, or Firm* — IP & T GROUP LLP

(57) ABSTRACT

The present disclosure relates to a connecting apparatus for a wiper, a wiper blade assembly, and a wiper device. A connecting apparatus for a wiper for interconnecting a wiper blade and a wiper arm includes: a main body portion having one surface on which the wiper arm is seated; and a cap portion rotatably provided on one side of the main body portion and configured to cover the wiper arm seated on the main body portion according to a rotation angle. The main body portion includes a groove configured to engage a rotation center of the cap portion, and a locking portion configured to be able to interfere with positional movement of the cap portion.

12 Claims, 9 Drawing Sheets

CONNECTING APPARATUS FOR WIPER, WIPER BLADE ASSEMBLY, AND WIPER DEVICE

CROSS-REFERENCE TO RELATED APPLICATION

The present application claims priority under 35 U.S.C. § 119(a) to Korean patent application number 10-2021-0120038 filed on Sep. 8, 2021, in the Korean Intellectual Property Office, the entire disclosure of which is incorporated by reference herein.

BACKGROUND

Technical Field

The present disclosure relates to a connecting apparatus for a wiper, a wiper blade assembly, and a wiper device.

Related Art

In general, a wiper device is installed in a vehicle to wipe the surface of a windshield. Such the wiper device includes a wiper motor, a wiper arm, and a wiper blade, and an adapter may be used for structural connection between the wiper arm and the wiper blade.

The wiper arm is connected to a rotation shaft of the wiper motor at the base end to reciprocate by the wiper motor, and one or more wiper arms are provided depending on the size of the windshield. When a plurality of the wiper arms are provided, the wiper arms are provided such that rotation does not interfere with each other.

In addition, the wiper blade is also detachably coupled to an end of the wiper arm through the adapter. The wiper blade is provided in a form of a straight line and performs wiping functions by sliding the surface of the windshield in accordance with the movement of the rotating wiper arm while maintaining a state of being in close contact with the windshield.

Such the wiper blade may be continuously rubbed by the windshield in a state of being installed in the vehicle, causing abrasion as the period of use has elapsed, generation of unnecessary noise, or deterioration in the wiping performance for the surface. Therefore, the wiper blade requires continuous replacement. In this case, a user of a vehicle needs to separate the existing wiper blade from the wiper arm and then connect a new wiper blade. In this case, an adapter having a structure that the wiper arm is detachable is applied.

There are some cases that the adapter to which the wiper arm is detachable may include a rotatable cap to firmly hold connection of the wiper arm. However, conventional products cause, when connecting the wiper arm by opening a cap, inconvenience due to improper coupling as the front end of the wiper arm interferes with the cap. There also has been a concern that the wiper arm is separated from the adapter due to the placement in which the rotational direction of the cap and the direction that the wiper arm is separated coincide.

SUMMARY

The present disclosure has been made in an effort to solve the issues of the related art as described above. Embodiments provide a connecting apparatus for a wiper, a wiper blade assembly, and a wiper device including a cap configured to maintain connection of a wiper arm to an adapter for connecting the wiper arm and allowing the cap to perform a translational motion so that interference with the cap may be prevented when coupling the wiper arm and having a structure in which rotational motion of the cap is allowed or restricted by the translational motion thereby preventing unnecessary separation of the wiper arm.

In accordance with an aspect of the present disclosure, there is provided a connecting apparatus for a wiper for interconnecting a wiper blade and a wiper arm, including: a main body portion having one surface on which the wiper arm is seated; and a cap portion rotatably provided on one side of the main body portion and configured to cover the wiper arm seated on the main body portion according to a rotation angle. The main body portion includes: a groove configured to engage a rotation center of the cap portion; and a locking portion configured to be able to interfere with positional movement of the cap portion. The groove is configured to allow a position of the rotation center to be movable from a first position where rotation of the cap portion is restricted as the cap portion is caught by the locking portion to a second position where rotation of the cap portion is allowed as the cap portion is dislocated from the locking portion.

Specifically, each of the rotation center and the groove may have a non-circular cross section, the groove may have a form in which a first part configured to restrict rotation of the rotation center and a second part configured to allow rotation of the rotation center communicate with each other, the first position may be where the rotation center is placed in the first part, the second position may be where the rotation center is placed in the second part, and the locking portion may be configured to prevent the cap portion from moving from the first position to the second position.

Specifically, the minimum width of the first part of the groove may be smaller than the maximum width of the rotation center to restrict rotation of the rotation center, and the minimum width of the second part of the groove may be provided to be greater than the maximum width of the rotation center to allow rotation of the rotation center.

Specifically, the locking portion may include a locking protrusion which is in close contact with the cap portion to restrict positional movement of the rotation center with respect to the groove.

Specifically, the locking portion may be formed in the shape of a cantilever in which the opposite side of the locking protrusion is fixed, and configured such that the locking protrusion moves to cause dislocation from the cap portion when transformed by an external force to allow the positional movement of the rotation center with respect to the groove.

Specifically, the locking protrusion may be configured to form an inclined surface or a curved surface that is gently curved toward a front end of the locking portion so that the locking portion is pressed down by the cap portion when the cap portion moves from the second position to the first position.

Specifically, the main body portion may have a lower side connected to the wiper blade and an upper surface on which the wiper arm is seated, and the cap portion may be provided at a front end in a longitudinal direction of the main body portion so as to cover a front end of the wiper arm seated on the main body portion by rotation.

Specifically, the main body portion may include a pair of hinge portions in which the grooves in a penetrating or non-penetrating form are provided, and the locking portion may be disposed in parallel with the hinge portions between the pair of hinge portions.

Specifically, the hinge portion may be surrounded by the cap portion, and the locking portion may have a shape that is more extended than the hinge portion, while one end thereof may be extended to the outside of the cap portion so as to be exposed to the outside.

Specifically, the cap portion may have an opening through which one end of the locking portion is exposed, and an upper end of the opening may be configured to be engaged by the locking protrusion of the locking portion.

In accordance with another aspect of the present disclosure, there is provided a wiper blade assembly including: the connecting apparatus; and a wiper blade connected to the connecting apparatus and configured to slide along a surface of a target of close contact by being in close contact with the surface.

In accordance with another aspect of the present disclosure, there is provided a wiper device including: the wiper blade assembly; and a wiper arm seated on the connecting apparatus.

A connecting apparatus for a wiper, a wiper blade assembly, and a wiper device according to embodiments of the present disclosure may facilitate attachment and detachment of a wiper arm by including an adapter used to connect the wiper arm to a wiper blade having a rotatable cap and allowing the cap to be movable in the longitudinal direction, and prevent separation of the wiper arm from the adaptor in advance by allowing rotation of the cap to be restricted depending on the longitudinal position of the cap.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The objects, specific advantages, and novel features of the present disclosure will become more apparent from the following detailed description and preferred embodiments taken in conjunction with the accompanying drawings. In adding reference numbers to components of each drawing in the present specification, it should be noted that only the same components are given with the same number as much as possible even if the components are shown in different drawings. In addition, in describing the present disclosure, if it is determined that the detailed description of a related known technology may unnecessarily obscure the gist of the present disclosure, the detailed description thereof will be omitted.

Hereinafter, a connecting apparatus for a wiper according to an embodiment the present disclosure will be described with reference to the drawings.

Figure 1:
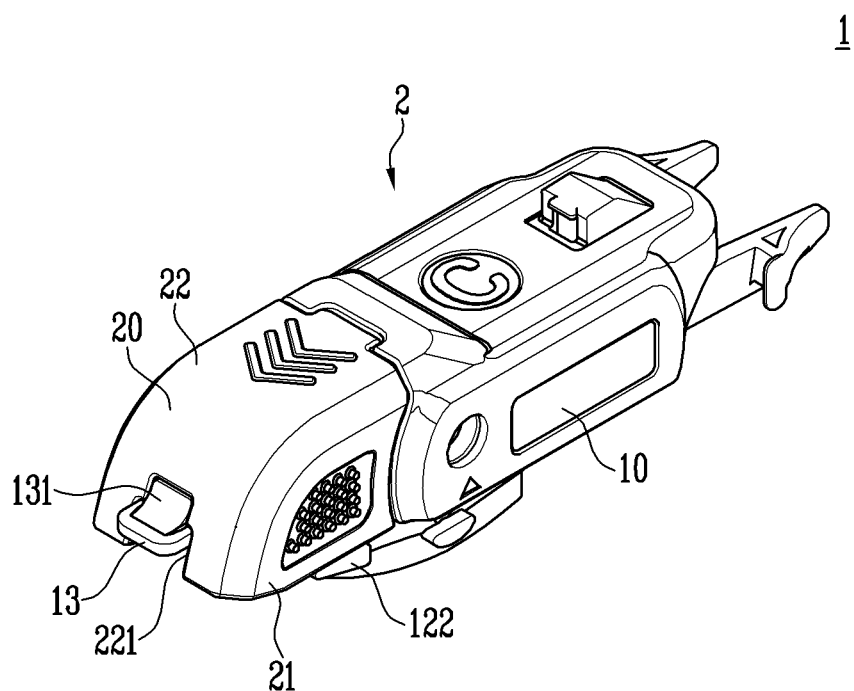
FIGS. 1 and 2 illustrate perspective views of a connecting apparatus for a wiper in accordance with an embodiment of the present disclosure.
Figure 2:
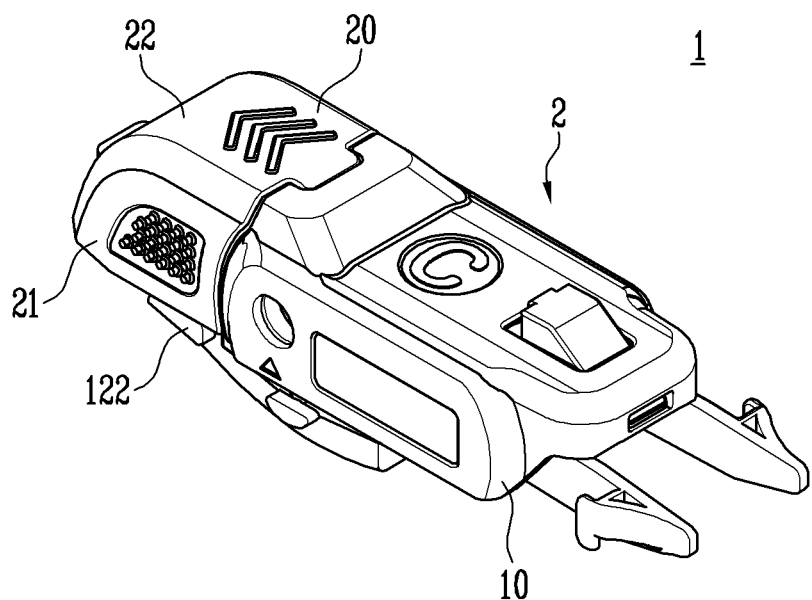
Figure 3:
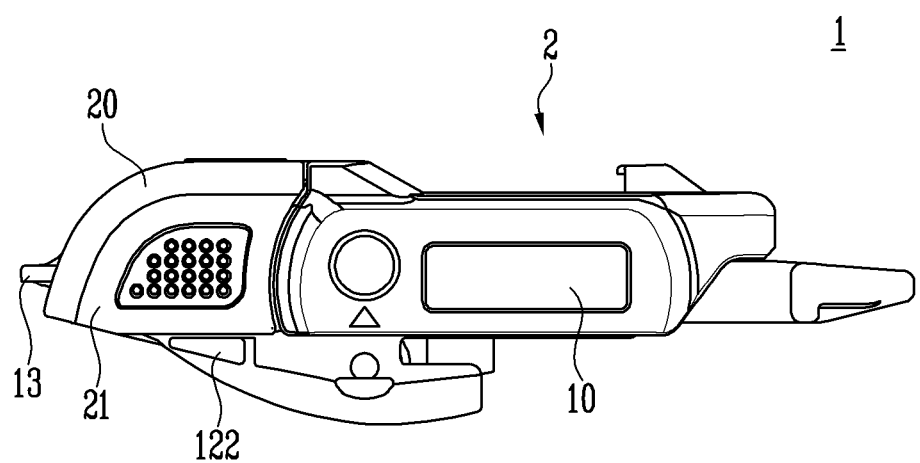
FIG. 3 illustrates a side view of a connecting apparatus for a wiper in accordance with an embodiment of the present disclosure.
Figure 4:
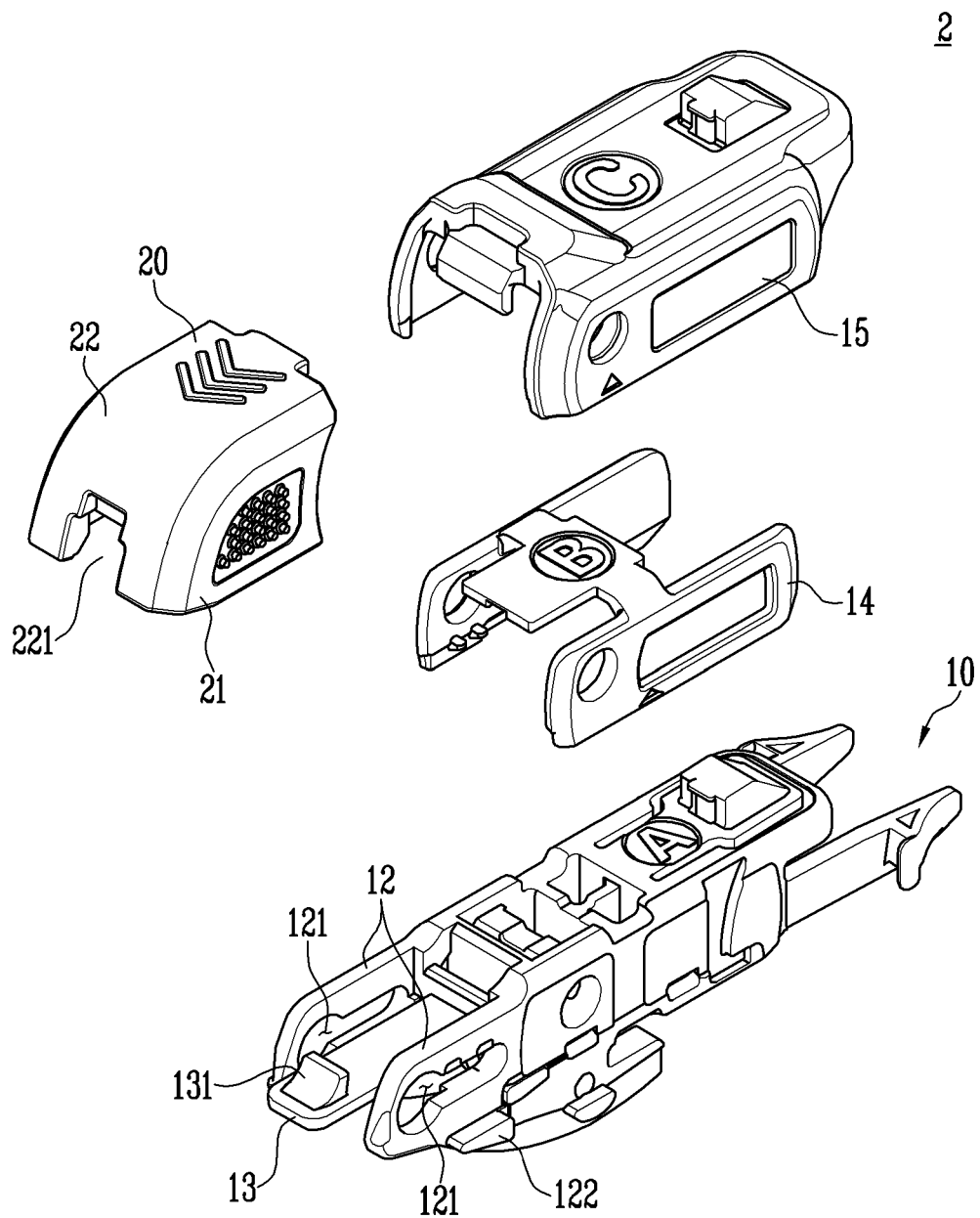
FIG. 4 illustrates an exploded perspective view of a connecting apparatus for a wiper in accordance with an embodiment of the present disclosure.

FIGS. 1 and 2 illustrate perspective views of a connecting apparatus for a wiper in accordance with an embodiment of the present disclosure, FIG. 3 illustrates a side view of the connecting apparatus for a wiper in accordance with an embodiment of the present disclosure, and FIG. 4 illustrates an exploded perspective view of the connecting apparatus for a wiper in accordance with an embodiment of the present disclosure.

Figure 5:
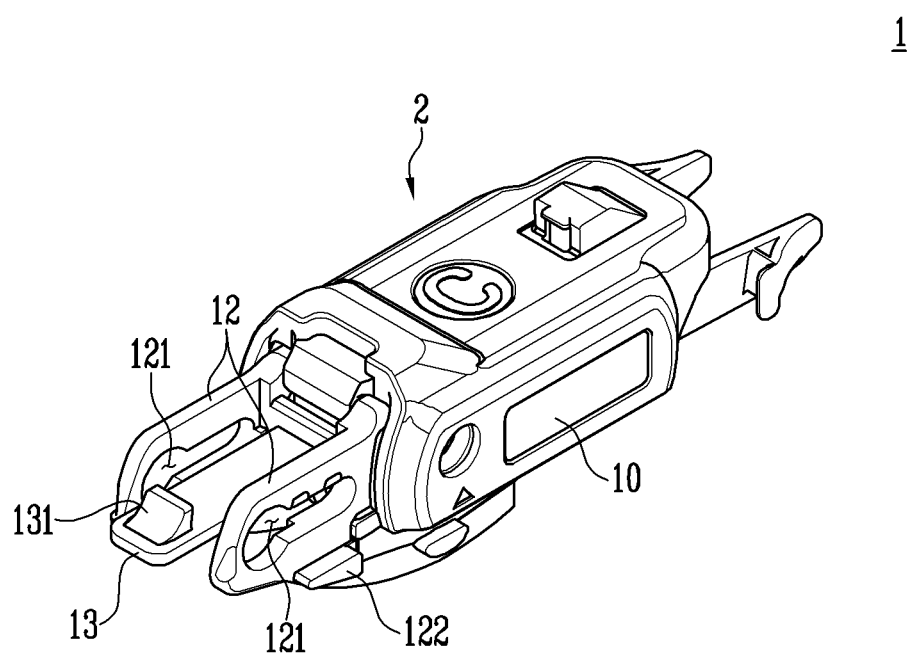
FIGS. 5 and 6 illustrate perspective views of a main body portion in a connecting apparatus for a wiper in accordance with an embodiment of the present disclosure.
Figure 6:
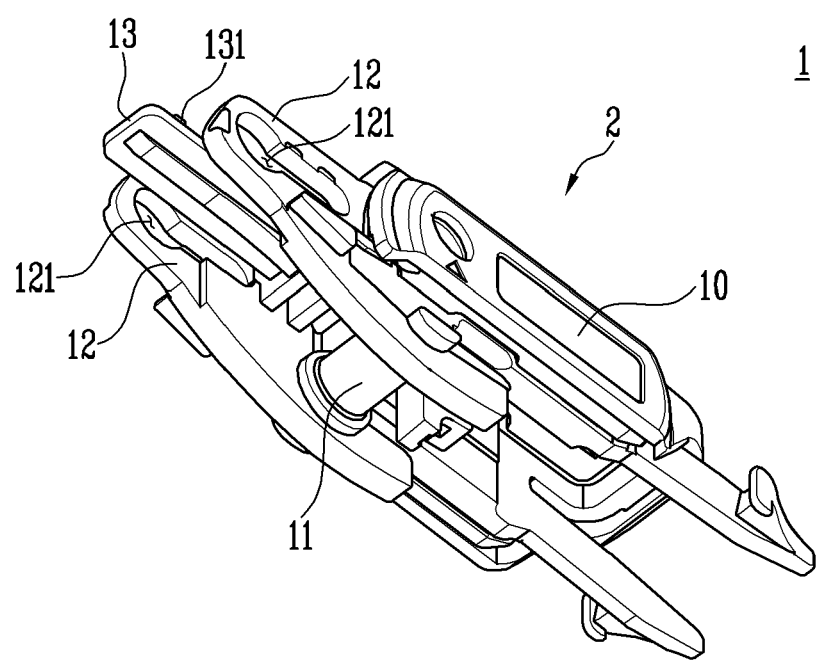
Figure 7:
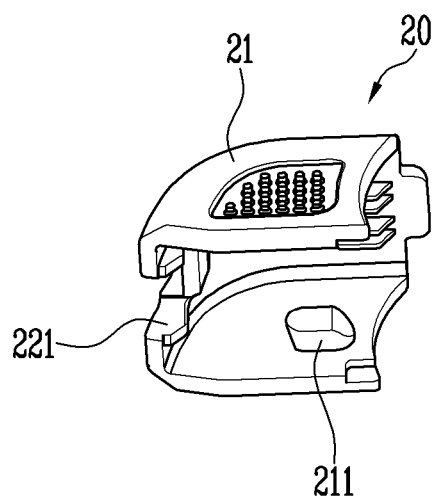
FIG. 7 illustrates a perspective view of a cap portion in a connecting apparatus for a wiper in accordance with an embodiment of the present disclosure.

In addition, FIGS. 5 and 6 illustrate perspective views of a main body portion in the connecting apparatus for a wiper in accordance with an embodiment of the present disclosure, FIG. 7 illustrates a perspective view of a cap portion in the connecting apparatus for a wiper in accordance with an embodiment of the present disclosure, and FIGS. 8 to 12 illustrate side views describing a method of using the connecting apparatus for a wiper in accordance with an embodiment of the present disclosure.

For reference, the longitudinal direction as used hereinafter may refer to a direction that a wiper blade or a wiper arm 3 extends long and refer to a left-right direction with reference to FIG. 3. In addition, the width direction may refer to a direction perpendicular to the length direction.

In addition, the height direction may refer to a direction away from a target of close contact with which the wiper blade comes in contact, and may also refer to a vertical direction with reference to FIG. 3. Of course, it should be noted that the above directionality does not limit the right of the present disclosure. Rather, it is only for the convenience in describing the present disclosure.

In addition, the movement or motion described in the present specification is relative, and a configuration other than a moving object will not necessarily be construed to be limited in a fixed position. In addition, expressions such as connecting, fastening, engagement, or fixing in the present specification encompass a case that two configurations act indirectly with the other configuration interposed therebetween, in addition to a case that the two configurations act directly.

The present disclosure may further include a wiper blade and a wiper arm 3 in addition to a connecting apparatus 2 for a wiper to be described later. In this case, the wiper blade, the connecting apparatus 2 for a wiper and the wiper arm 3 may be collectively referred to as a wiper device 1. Also, a configuration (the wiper blade and the connecting apparatus 2 for a wiper) except for the wiper arm 3 in the wiper device 1 may be referred to as a wiper blade assembly. Hereinafter, before describing the connecting apparatus 2 for a wiper, the wiper arm 3 and the wiper blade will be briefly described.

The wiper arm 3 is configured to rotate around a base end and deliver a rotational force to the wiper blade as the wiper blade is connected at the end, thereby cleaning a target of close contact by the wiper blade. Here, the target of close contact may be a windshield of a vehicle, but is not limited thereto. In addition, any object capable of cleaning by sliding may be the target of close contact.

The wiper arm 3 is directly or indirectly connected to a driving source (motor, etc.) provided in a vehicle and is configured to rotate while the end draw an arc shape by the rotational force of a driving source. Here, connected to the end of the wiper arm 3, the wiper blade is configured to perform cleaning by moving along a predetermined path while being in a close contact with the target of close contact.

The wiper arm 3 may have various unlimited shapes, and the shape of the connecting apparatus 2 for a wiper may be freely changed in correspondence to the shape of the wiper arm 3. Of course, the connecting apparatus 2 for a wiper may be provided in a multi-connecting type to which a plurality of wiper arms 3 having each different shape may be selectively coupled.

The wiper blade (not shown) is configured to clean the surface of the target of close contact through movement by coming in close contact with the surface of the target of close contact. In this case, as mentioned above, the target of close contact may be any object that is cleaned by sliding, such as a windshield of a vehicle.

The wiper blade may include a contact member and an elastic member. The contact member is configured to directly come in contact with the surface of the target of close contact and slide along the surface. In a state where no external force is applied, the contact side of the contact member may form a shape different from the surface of the target of close contact and be transformed naturally into a shape identical to the surface of the target of close contact by being pressed toward the target of close contact when the wiper blade is coupled to the wiper arm 3 through the connecting apparatus 2 for a wiper.

In addition to the contact member and the elastic member, the wiper blade may further include configurations such as a cover member configured to prevent the wiper blade from floating by wind when a vehicle is running by being provided on the opposite side of the contact member or a closing cover provided at both ends in the longitudinal direction.

The connecting apparatus 2 for a wiper is configured to connect the wiper arm 3 to the wiper blade and may be referred to as an adapter. The connecting apparatus 2 for a wiper does not refer to a configuration that is completely separated from the wiper blade or the wiper arm 3 and may form a part of the wiper blade. Alternatively, a part of the connecting apparatus 2 for a wiper may belong to the wiper blade and the remaining parts may belong to the wiper arm 3. However, for convenience in the present specification, the connecting apparatus 2 for a wiper will be described as an independent configuration connecting the wiper blade and the wiper arm 3 together.

Referring to FIGS. 1 to 7 first, the connecting apparatus 2 for a wiper includes a main body portion 10 and a cap portion 20.

The wiper arm 3 is seated on one surface of the main body portion 10. Specifically, the lower side of the main body portion 10 may be connected to the wiper blade, and the wiper arm 3 may be seated on the upper side. The main body portion 10 may include a hinge shaft 11 for fastening with the wiper blade, and the hinge shaft 11 is inserted into a hinge groove (not shown) provided in the wiper blade, so that the main body portion 10 is hinge-rotatably connected with respect to the wiper blade.

At this time, the hinge shaft 11 of the main body portion 10 may form a bar shape as shown in FIG. 6, or a form with a middle portion discontinued is possible as well. Contrary to the drawings, a structure in which the hinge shaft 11 is provided on the wiper blade and a hinge groove is provided in the main body portion 10 may also be possible. In other words, as long as the main body portion 10 may be hinge-rotatably connected to the wiper blade, the fastening structure of the main body portion 10 and the wiper blade may be diversely altered.

A hinge portion 12 may be provided in the main body portion 10. The hinge portion 12 may be configured for rotation of the cap portion 20 and be provided at a front end of the main body portion 10 in a longitudinal direction. Limiting the position of the hinge portion 12 in this way is to make the cap portion 20 rotating in the hinge portion 12 caught by the front end 3a of the wiper arm 3.

When the cap portion 20 is coupled to the main body portion 10, the hinge portion 12 may be accommodated inside the cap portion 20 to be described later and provided as a pair to assist stable rotation of the cap portion 20. The pair of hinge portions 12 may be provided in parallel with each other.

The hinge portion 12 may be provided in a shape of cantilever, the pair of hinge portions 12 may be spaced apart from each other, and a locking portion 13 to be described later may be disposed between the pair of hinge portions 12. Of course, a connecting bar (not shown) for interconnecting the pair of hinge portions 12 is provided to the extent in which interference with the locking portion 13 is excluded so as to maintain a gap between the pair of hinge portions 12.

The hinge portion 12 has a form in which a rotation center 211 of the cap portion 20 is engaged in order to implement rotation of the cap portion 20. The rotation center 211 of the cap portion 20 may have a protruding form inside the cap portion 20, and the hinge portion 12 is provided with a groove 121 in which the rotation center 211 of the cap portion 20 is seated. In this case, the groove 121 may have a penetrating or non-penetrating form.

The groove 121 may be provided in a structure that enables both the rotational movement and the translational movement of the cap portion 20. However, the rotational movement of the cap portion 20 may be partially restricted on the groove 121. Specifically, the groove 121 may have a non-circular cross-section as a whole and include a first part in a shape of an ellipse/super-ellipse or a rod to restrict rotation of the rotation center 211 and a second part in a circular shape to allow rotation.

The rotation center 211 may also have a non-circular cross-section. For example, the rotation center 211 may have a shape such as an ellipse or a super-ellipse. In this case, since the minimum width (height) of the first part of the groove 121 is smaller than the maximum width of the rotation center 211, when the rotation center 211 is positioned in the first part of the groove 121, rotation of the rotation center 211 is restricted. On the other hand, the minimum width (radius) of the second part of the groove 121 may be provided to be greater than the maximum width of the rotation center 211 so that when the rotation center 211 is positioned in the second part of the groove 121, the rotation center 211 becomes rotatable.

Since the first part and the second part may be provided to communicate with each other, the position of the rotation center 211 may be movable between a first position where it is placed in the first part of the groove 121 and a second position where it is placed in the second part of the groove 121. The permission/restriction for rotation of the cap portion 20 will be described in detail again below.

However, in the state in which the rotation center 211 is positioned on the second part of the groove 121, the state (angle) of the rotation center 211 for moving to the first part of the groove 121 may be restricted.

Figure 11:
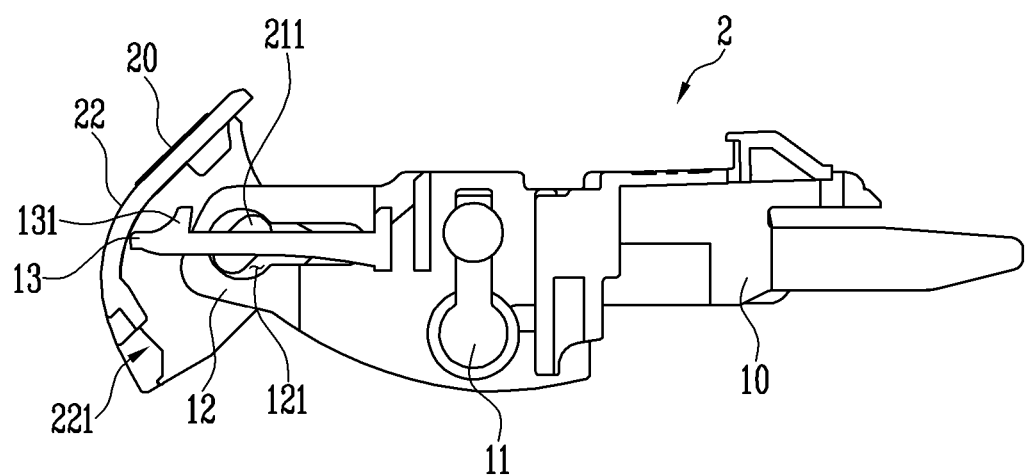

As an example, in the case of FIG. 11 that the cap portion 20 rotates when the rotation center 211 is positioned in the second part of the groove 121, the rotation center 211 (excluding the engagement by the locking portion 13) is caught between the second part and the first part of the groove 121 so as to be in a state in which the movement to the first part is not allowed. Therefore, an embodiment of the present disclosure may prevent the cap portion 20 from unintentionally moving from the second part to the first part of the groove 121.

The hinge portion 12 may be provided with the groove 121 that is penetrated or recessed inward, and a seating end 122 may be provided on the outside. The seating end 122 may be configured to face or come in contact with the cap portion 20 when the cap portion 20 rotates in a direction that the wiper arm 3 is covered.

In addition, the seating end 122 may be configured to guide the lower end of the cap portion 20 to move in the left and right direction based on FIG. 3. In other words, when the cap portion 20 is about to move from the rotation restricted position to the rotation permitted position with respect to the main body portion 10, the seating end 122 is configured to guide the sliding of the cap portion 20 to allow the cap portion 20 to softly move from the rotation restricted position (first position) to the rotation permitted position (second position) without unnecessary rotation. In particular, the seating end 122 may have a function of suppressing unnecessary rotation of the cap portion 20 when the rotation center 211 passes from the first part to the second part of the groove 121.

Such the seating end 122 may be provided to form a smooth outer shape by filling a step between the hinge portion 12 and the cap portion 20. Of course, as long as the rotation center 211 of the cap portion 20 is placed in the first part of the groove 121, rotation of the cap portion 20 may be suppressed and the clockwise rotation of the cap portion 20 may be suppressed by the hinge portion 12 itself. Therefore, the seating end 122 may be omitted.

A locking portion 13 is provided between the pair of hinge portions 12 in the main body portion 10. The locking portion 13 is configured to be able to interfere with the positional movement of the cap portion 20. In particular, it may be provided to interfere with the rotation center 211 from passing from the first part to the second part of the groove 121.

The locking portion 13 may include a locking protrusion 131 which comes in close contact with a part of the cap portion 20 to restrict the positional movement of the rotation center 211 with respect to the groove 121. Such the locking portion 13 may be in a shape of cantilever that the opposite side of the locking protrusion 131 is fixed. When transformed by an external force, the locking portion 13 may be dislocated from the cap portion 20 as the locking protrusion 131 moves (especially downward). Accordingly, as the cap portion 20 is deviated from the engagement of the locking portion 13, the positional movement of the rotation center 211 with respect to the groove 121 may be permitted.

As an example, the locking protrusion 131 may be provided in a form to block the front end of the cap portion 20, and when a user pushes down the front end of the locking portion 13, the locking protrusion 131 may be transformed to be deviated away from the front end of the cap portion 20 while descending. As described above, when the cap portion 20 moves to the front end in the longitudinal direction in a state in which the locking protrusion 131 moves downward, the rotation center 211 moves from the first part to the second part of the groove 121, so that rotation of the cap portion 20 becomes possible with respect to the hinge portion 12.

The locking portion 13 may be restored to an original position by elasticity. In other words, when the external force applied to the locking portion 13 is removed, the locking protrusion 131 may be provided to be engaged with the front end of the cap portion 20 while ascending upward.

The front end of the locking portion 13 may be provided in an external force applicable form for positional movement of the locking protrusion 131. As an example, the locking portion 13 may be provided to be exposed to the outside as the front end is further protruded forward from the cap portion 20, and the user may make the locking protrusion 131 descend by pressing the front end exposed from the locking portion 13 to the outside. An opening 221 may be provided in the cap portion 20 to make the front end of the locking portion 13 exposed to the outside, which will be described later.

The main body portion 10 may further include an auxiliary member 14 and a cover portion 15. The auxiliary member 14 and the cover portion 15 are configurations which may be added to assist connection of the wiper arm 3 having various shapes, and may be added or excluded depending on the shape or width of the wiper arm 3.

In other words, in the main body portion 10, a first type of wiper arm 3 may be connected in a state in which the auxiliary member 14 and the cover portion 15 shown in FIG. 4 are removed, a second type of wiper arm 3 may be connected in a state in which only the auxiliary member 14 is connected, and a third type of wiper arm 3 may be connected in a state in which both the auxiliary member 14 and the cover portion 15 are connected.

In addition, regarding the main body portion 10, the parts identified through the drawings but not described in this specification may be changed as much as possible depending on the kinds or types of the wiper arm 3. Though the parts may be a part constituting an embodiment of the present disclosure, it should be noted that the claims of the present disclosure cannot be construed as being limited due to the shape shown in the drawings.

For example, in the drawing, a pair of leg portions (not shown) are provided at the rear end of the main body portion 10, but the leg portions may be applied or not applied depending on the type of the wiper arm 3 to which an embodiment of the present disclosure is applied.

In addition, a hole (not shown) may be formed laterally in the main body portion 10, the auxiliary member 14, and the cover portion 15, and a pin provided in the wiper arm 3 may be inserted and fixed in the hole. However, when an embodiment of the present disclosure is applied to the wiper arm 3 with no pins, the hole in the main body portion 10 may be omitted.

In addition, a structure for inserting and engaging a protrusion structure of the wiper arm 3 may be provided on the side surface of the main body portion 10 or the cover portion 15. In other words, the wiper arm 3 may move in the vertical direction to be seated on the main body portion 10 and move in the longitudinal direction to be engaged by the main body portion 10.

Of course, the main body portion 10 may be provided in a general-purpose structure that enables connection of all the various types of wiper arms 3. In this case, in addition to the connecting elements for the wiper arm 3 shown in the drawings, any additional connecting element may be added.

The cap portion 20 is rotatably provided on one side of the main body portion 10. The cap portion 20 may have a cover surface 22 and a pair of rotation surfaces 21, and the cover surface 22 and the rotation surface 21 may be formed at right angles so that the cap portion 20 may form a [-shaped cross-section.

The cap portion 20 is provided to interfere with the wiper arm 3 seated on the main body portion 10 in accordance with the rotation angle. For example, the cap portion 20 may be provided at the front end in the longitudinal direction in the main body portion 10 to cover the front end 3a of the wiper arm 3 seated on the main body portion 10 by rotation.

Specifically, the rotation center 211 engaged with the hinge portion 12 of the main body portion 10 is provided on the rotation surface 21 of the cap portion 20, and when the cap portion 20 rotates with respect to the hinge portion 12 based on the rotation surface 21, the cover surface 22 of the cap portion 20 may cover the front end 3a of the wiper arm 3 or expose the front end 3a of the wiper arm 3 to the outside.

A friction protrusion (not shown) for gripping may be provided on the outer side of the rotation surface 21 of the cap portion 20, which allows a user to comfortably grip the cap portion 20 for translational movement or rotation of the cap portion 20. Of course, in addition to the friction protrusion, application of a surface with a different roughness is also possible for the rotation surface 21 of the cap portion 20.

The rotation center 211 may be provided inside the rotation surface 21 of the cap portion 20. The rotation center 211 may have a shape protruding inward and be inserted into the groove 121 of the hinge portion 12 described above.

The rotation center 211 of the cap portion 20 may have a non-circular cross-section as shown in FIG. 7 and form a shape such as an ellipse or a super-ellipse. In addition, the maximum width in the rotation center 211 of the cap portion 20 is greater than the minimum width (vertical height) in the first part of the groove 121 such that rotation of the rotation center 211 is not performed when positioned in the first part. On the other hand, the maximum width in the rotation center 211 of the cap portion 20 is smaller than the minimum width (diameter) in the second part of the groove 121 such that rotation of the rotation center 211 may be possible within a certain angle when positioned in the second part.

The rotation center 211 may be provided to be movable in the longitudinal direction on the groove 121, and when the rotation center 211 is placed in the first part of the groove 121, rotation of the rotation center 211 is suppressed, making the cap portion 20 in a locked state.

On the other hand, when the rotation center 211 moves to the second part of the groove 121, rotation of the rotation center 211 is allowed, leading to rotation of the cap portion 20. In this case, dislocation of the wiper arm 3 may be possible.

In other words, further more to being provided to cover or not to cover the front end 3a of the wiper arm 3 by simple rotation, the cap portion 20 according to an embodiment of the present disclosure may be provided to make a state in which the front end 3a of the wiper arm 3 is covered submerged. Therefore, even if a force to make the wiper arm 3 dislocated upward from the main body portion 10 is applied, rotation of a cap portion 20 is suppressed, thereby effectively preventing separation of the wiper arm 3.

Since the cap portion 20 is provided to surround the hinge portion 12 through the cover surface 22 and the pair of rotation surfaces 21, the rotation center 211 of the cap portion 20 or the groove of the hinge portion 12 may not be exposed to the outside. Of course, as the cap portion 20 performs translational movement, at least a part of the groove 121 may be exposed to the outside while deviating from the rotation surface 21 of the cap portion 20.

The lower end of the rotation surface 21 of the cap portion 20 may be seated on a seating end 122 provided in the hinge portion 12. The rotation angle of the cap portion 20 may be limited by the seating end 122 such that rotation of the cap portion 20 may be suppressed as the cover surface 22 of the cap portion 20 comes in close contact with the front end of the main body portion 10 or the hinge portion 12 in addition to the close contact of the rotation surface 21 of the cap portion 20 onto the seating end 122. Thus, the seating end 122 may be omitted as described above.

When the rotation center 211 of the cap portion 20 is placed in the first part of the groove 121, rotation of the cap portion 20 is locked, and when the rotation center 211 of the cap portion 20 is placed in the second part of the groove 121, rotation of the cap portion 20 is allowed. To prevent unnecessary release of the rotational locking of the cap portion 20, the locking portion 13 of the main body portion 10 as described above may be applied, and for this purpose, an opening 221 engaged with the locking portion 13 may be formed on the cover surface 22 in the cap portion 20.

The cover surface 22 of the cap portion 20 may be formed in a shape with a curved surface or a bent surface having a front surface and an upper surface, wherein an opening 221 may be formed in the lower end part of the front surface in the cover surface 22, and the locking portion 13 of the main body portion 10 may penetrate through the opening 221 of the cover surface 22 so that the front end may be exposed to the outside.

The locking protrusion 131 of the locking portion 13 may be caught on the upper end of the opening 221 while being positioned at the front than the cover surface 22, and thus the forward movement of the cap portion 20 may be restricted. In other words, rotation of the cap portion 20 is locked by the rotation center 211 of the cap portion 20 and the groove 121 of the hinge portion 12, such the locking may be maintained as the locking portion 13 and the opening 221 of the cap portion 20 are engaged each other.

An upper end of the opening 221 through which the locking protrusion 131 is caught in the cap portion 20 may form a stepped or recessed shape. Therefore, even if the locking protrusion 131 is caught at the upper end of the opening 221, the locking protrusion 131 may form a shape that hardly protrudes forward compared to the cover surface 22 of the cap portion 20. In addition, the locking protrusion 131 may form a curved shape that is smoothly connected to the front end of the locking portion 13 such that the locking protrusion 131 may form a surface that is continued with the cover surface 22 of the cap portion 20.

As described above, since the locking portion 13 may be elastically deformed by an external force by having a cantilever shape, when the locking portion 13 is deformed downward, deviation from the upper end of the opening 221 is possible while the locking protrusion 131 descends. In this case, the cap portion 20 may move forward, and when the cap portion 20 moves forward, rotation of the cap portion 20 may be allowed as the rotation center 211 of the cap portion 20 moves from the first part to the second part of the groove 121.

On the other hand, if no additional external force is applied to the locking portion 13, the locking protrusion 131 is engaged with the opening 221 to restrict the forward movement of the cap portion 20, and the position of the rotation center 211 of the cap portion 20 is fixed onto the first part of the groove 121, suppressing rotation of the cap portion 20.

Hereinafter, an operation method for separating the wiper arm 3 in an embodiment of the present disclosure will be described with reference to FIGS. 8 to 12.

Figure 8:
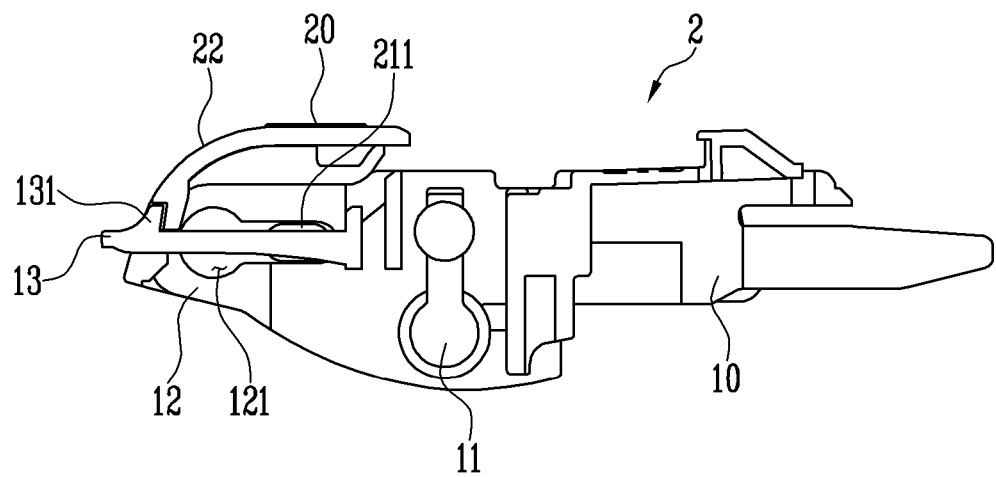
FIGS. 8 to 12 illustrate side views describing a method of using a connecting apparatus for a wiper in accordance with an embodiment of the present disclosure.
Figure 9:
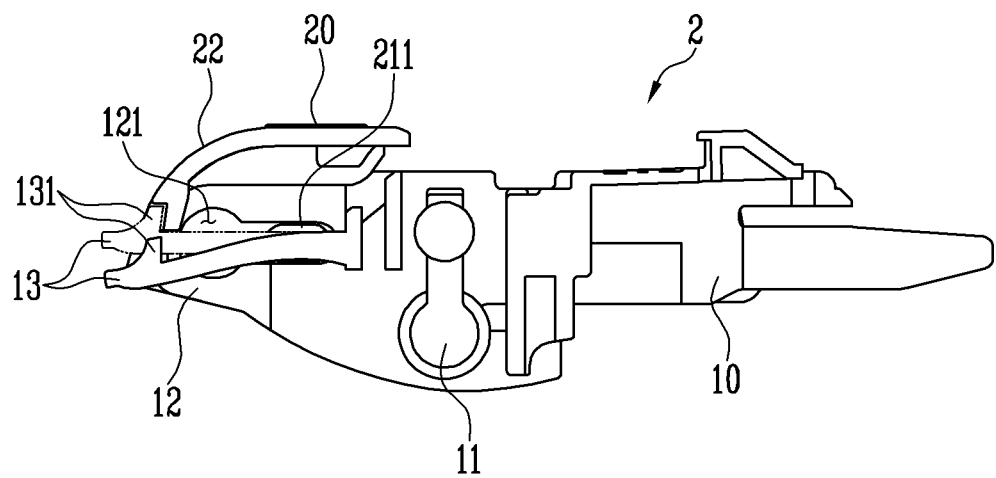
Figure 10:
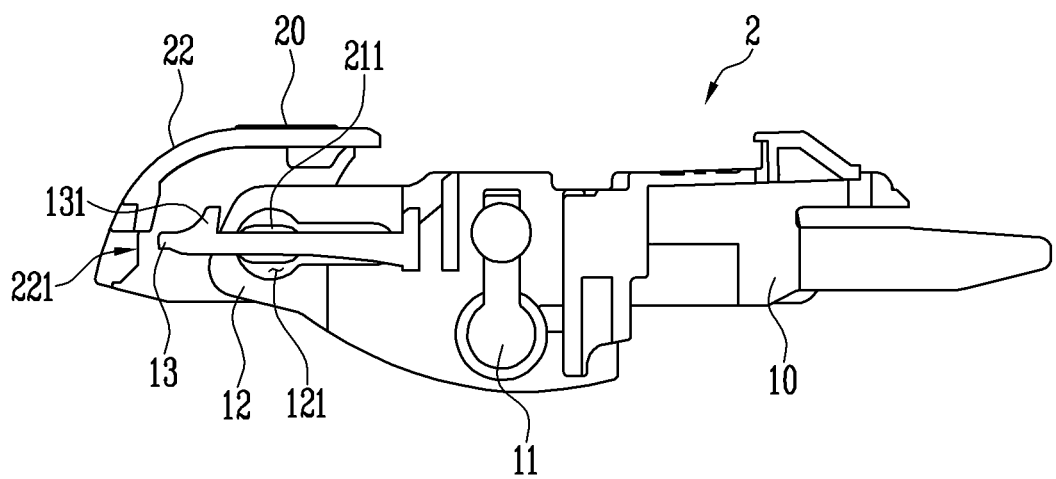

Here, FIG. 8 illustrates a state in which the wiper arm 3 is completely fixed to the connecting apparatus 2 for a wiper, FIG. 9 illustrates a transformed state of the locking portion 13 as a first state for separating the wiper arm 3 from the connecting apparatus 2 for a wiper, FIG. 10 illustrates a state of the cap portion 20 that performed translational movement as a second state after the first state, and FIG. 11 illustrates a state in which the cap portion 20 rotates to allow deviation of the wiper arm 3 as a third state after the second state. For reference, illustration of the wiper arm 3 is omitted in FIGS. 8 to 11 for convenience.

Figure 12:
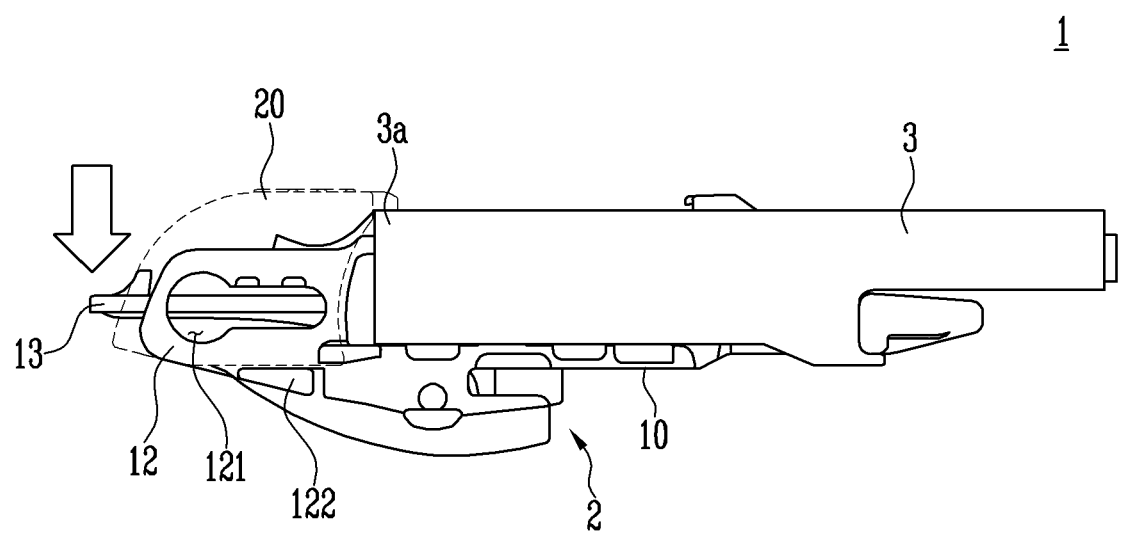
Figure 12:
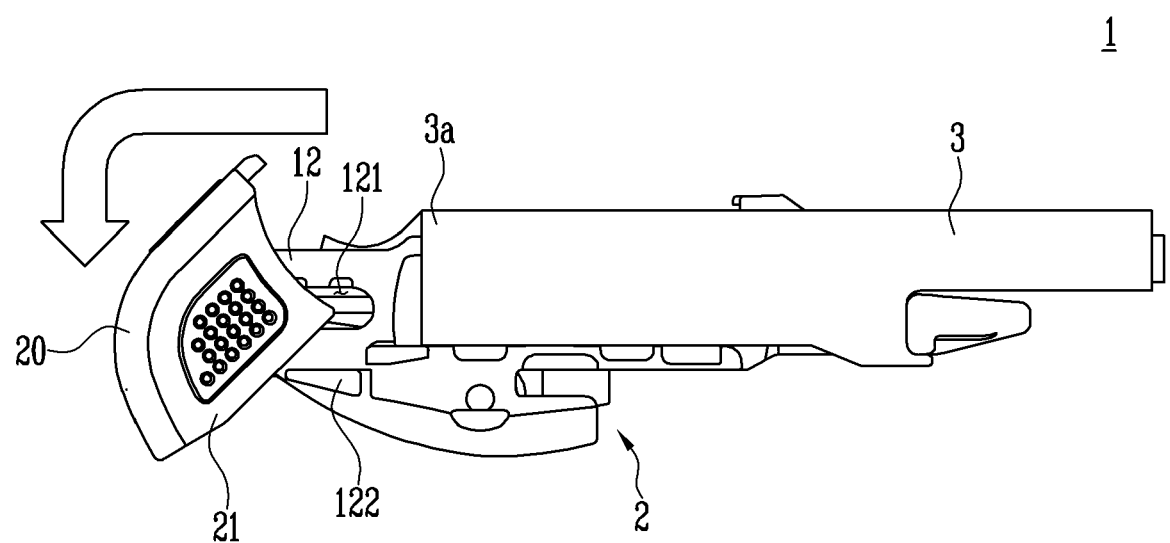

In addition, FIG. 12 illustrates, using arrows, necessary operations for separating the wiper arm 3 in the connecting apparatus for a wiper.

First, referring to FIG. 8, the rotation center 211 of the cap portion 20 is seated in the first part of the groove 121 so that rotation is not possible. At this time, since the locking protrusion 131 of the locking portion 13 is caught at the upper end of the opening 221 on the cover surface 22 of the cap portion 20, the movement of the cap portion 20 in the longitudinal direction is restricted. Accordingly, the wiper arm 3 seated on the main body portion 10 may maintain a state in which the front end 3a is caught by the cap portion 20.

According to FIG. 9, the locking portion 13 has a shape that is more extended than the hinge portion 12 surrounded by the cap portion 20, while one end thereof is extended to the outside of the cap portion 20 through the opening 221 to be exposed to the outside. Therefore, the user may apply an external force to one end (front end) of the locking portion 13. When the user presses one end of the locking portion 13 down, the engagement between the locking protrusion 131 and the cover surface 22 is released as the locking protrusion 131 descends and is dislocated from the cover surface 22. The restriction of the movement in the longitudinal direction with respect to the cap portion 20 is removed thereby.

Subsequently, as shown in FIG. 10, the user may move the cap portion 20 forward. Accordingly, the rotation center 211 of the cap portion 20 is positioned at the second part of the groove 121, and the second part has a shape that allows rotation with respect to the rotation center 211 of the cap portion 20.

For reference, the user is to press the locking portion 13 down until the cover surface 22 of the cap portion 20 is able to pass the front of the locking protrusion 131, and when the locking protrusion 131 is placed rearward than the opening 221 of the cap portion 20, the external force applied to the locking portion 13 may be removed, leading to restoration of the locking portion 13 to its original state by its own elasticity.

Finally, referring to FIG. 11, the user rotates the cap portion 20 counterclockwise while holding the rotation surface 21 of the cap portion 20. In this case, since the cover surface 22 of the cap portion 20 exposes the front end 3a of the wiper arm 3 to the outside, the fixing function of the wiper arm 3 by the cap portion 20 is released.

In this case, counterclockwise rotation of the cap portion 20 may be performed until the front end of the locking portion 13 comes into contact with the inside of the cover surface 22. In order to further limit an angle of counterclockwise rotation of the cap portion 20, a protrusion (not shown) that may come into contact with the front end of the locking portion 13 may be disposed on the inside of the cover surface 22.

Summarizing this series of operations with reference to FIG. 12, rotation of the cap portion 20 of an embodiment of the present disclosure is restricted as the rotation center 211 and the groove 121 having a non-circular shape are engaged with each other while the translational movement of the cap portion 20 is restricted by the locking protrusion 131. The user may make the cap portion 20 perform translational movement by pressing the front end of the locking portion 13, and the locking for the front end 3a of the wiper arm 3 may be released by rotating the cap portion 20 counterclockwise when the rotation center 211 of the cap portion 20 and the groove 121 are rotatable with respect to each other.

Hereinafter, on the contrary, the order of fixing the wiper arm 3 with the cap portion 20 will be described.

In a state in which the cap portion 20 is rotated counterclockwise as shown in FIG. 11, the user places the wiper arm 3 on the main body portion 10. In particular, in an embodiment of the present disclosure, by making the cap portion 20 in FIG. 11 placed in a forward biased state compared to the cap portion 20 in FIG. 8 to which the wiper arm 3 is fixed, it is possible to eliminate the probability that the cap portion 20 interferes with the front end of the wiper arm 3 that is to be seated on the main body portion 10. In other words, an embodiment of the present disclosure allows the cap portion 20 to be biased forward, thereby greatly increasing the convenience when the wiper arm 3 is coupled.

After seating the wiper arm 3 on the main body portion 10, the user rotates the cap portion 20 clockwise to convert to a state as shown in FIG. 10. At this time, the front end 3a of the wiper arm 3 may or may not be partially covered up by the cover surface 22 of the cap portion 20.

Thereafter, the user is to move the cap portion 20 rearward. In this case, to prevent unnecessary engagement when the rotation center 211 of the cap portion 20 is turned to the second part and the first part of the groove 121, the locking protrusion 131 is provided to form a gently curved surface or an inclined surface while moving toward the front end of the locking portion 13, so as to allow the upper end of the opening 221 to naturally press down the locking portion 13 when the cap portion 20 moves backward.

For reference, as shown in FIG. 7, a chamfer may be applied to a rear end part of the rotation center 211 of the cap portion 20 so that the protrusion height is lowered toward the rear, thereby forming an inclined surface. Through this, according to an embodiment of the present disclosure, it is possible to, when coupling the cap portion 20 to the hinge portion 12 for the first time, make the coupling convenient.

In a state shown in FIG. 10, being difficult for a finger of a user to approach the front end of the locking portion 13, the locking protrusion 131 may have a shape to sufficiently deliver a descending force to the locking portion 13 when pushed by the cover surface 22 of the cap portion 20.

In other words, when the cap portion 20 is switched from the unlocked state (FIG. 11) to the locked state (FIG. 8), the locking portion 13 may, instead of applying an external force directly to the locking portion 13, indirectly absorb the external force by translational movement of the cap portion 20.

Once the cap portion 20 completes the rearward movement, rotation of the cap portion 20 is restricted while the rotation center 211 of the cap portion 20 is positioned in the first part of the groove 121 as a state shown in FIG. 8, and the locking protrusion 131 passes through the opening 221 to be engaged with the cover surface 22. At this time, since the front end of the locking portion 13 is exposed to the outside, the user may implement unlocking of the cap portion 20 while starting an operation of pressing the locking portion 13.

As described above, developed from a structure in which the cap portion 20 covers or exposes the front end 3a of the wiper arm 3 simply by rotation, an embodiment of the present disclosure restricts rotation of the cap portion 20 and further restricts the operation of releasing the rotation restriction of the cap portion 20, so that that the cap portion 20 may maintain the connection of the wiper arm 3 more stably. Thus, the present embodiment of the present disclosure may ensure reliable cleaning for the target of close contact.

Although the present disclosure has been described in detail with reference to certain exemplary embodiments, it is to explain the present disclosure specifically, and the present disclosure is not limited thereto. It should be apparent to those skilled in the art that various changes or modifications can be made within the technological spirit of the present disclosure.

All the simple modifications or variations of the present disclosure fall within the scope of the present disclosure, and the specific scope of protection of the present disclosure will be made clear by the appended claims.

What is claimed is:

1. A connecting apparatus for a wiper for interconnecting a wiper blade and a wiper arm, the connecting apparatus comprising:
   a main body portion having one surface on which the wiper arm is seated; and
   a cap portion rotatably provided on one side of the main body portion and configured to cover the wiper arm seated on the main body portion according to a rotation angle,
   wherein the main body portion comprises:
   a groove configured to engage a rotation center of the cap portion; and
   a locking portion configured to be able to interfere with positional movement of the cap portion, and
   wherein the groove is configured to allow a position of the rotation center to be movable from a first position where rotation of the cap portion is restricted as the cap portion is caught by the locking portion to a second position where rotation of the cap portion is allowed as the cap portion is dislocated from the locking portion.

2. The connecting apparatus of claim 1, wherein each of the rotation center and the groove has a non-circular cross section,
   the groove has a form in which a first part configured to restrict rotation of the rotation center and a second part configured to allow rotation of the rotation center communicate with each other,
   the first position is where the rotation center is placed in the first part,
   the second position is where the rotation center is placed in the second part, and
   the locking portion is configured to prevent the cap portion from moving from the first position to the second position.

3. The connecting apparatus of claim 2, wherein the minimum width of the first part of the groove is smaller than the maximum width of the rotation center to restrict rotation of the rotation center, and
   the minimum width of the second part of the groove is provided to be greater than the maximum width of the rotation center to allow rotation of the rotation center.

4. The connecting apparatus of claim 1, wherein the locking portion comprises a locking protrusion which is in close contact with the cap portion to restrict positional movement of the rotation center with respect to the groove.

5. The connecting apparatus of claim 4, wherein the locking portion is formed in the shape of a cantilever in which the opposite side of the locking protrusion is fixed, and configured such that the locking protrusion moves to cause dislocation from the cap portion when transformed by an external force to allow the positional movement of the rotation center with respect to the groove.

6. The connecting apparatus of claim 5, wherein the locking protrusion is configured to form an inclined surface or a curved surface that is gently curved toward a front end of the locking portion so that the locking portion is pressed down by the cap portion when the cap portion moves from the second position to the first position.

7. The connecting apparatus of claim 4, wherein the main body portion comprises a pair of hinge portions in which the groove and a second groove in a penetrating or non-penetrating form are provided, and
   the locking portion is disposed in parallel with the hinge portions between the pair of hinge portions.

8. The connecting apparatus of claim 7, wherein the hinge portions are surrounded by the cap portion, and
   the locking portion has a shape that is more extended than the hinge portion, while one end thereof is extended to the outside of the cap portions so as to be exposed to the outside.

9. The connecting apparatus of claim 4, wherein the cap portion has an opening through which one end of the locking portion is exposed, and
   an upper end of the opening is configured to be engaged by the locking protrusion of the locking portion.

10. The connecting apparatus of claim 1, wherein the main body portion has a lower side connected to the wiper blade and an upper surface on which the wiper arm is seated, and
    the cap portion is provided at a front end in a longitudinal direction of the main body portion so as to cover a front end of the wiper arm seated on the main body portion by rotation.

11. A wiper blade assembly comprising:
    the connecting apparatus of claim 1; and
    a wiper blade connected to the connecting apparatus and configured to slide along a surface of a target of close contact by being in close contact with the surface.

12. A wiper device comprising:
    the wiper blade assembly of claim 11; and
    a wiper arm seated on the connecting apparatus.

* * * * *